(12) United States Patent
Pätz

(10) Patent No.: US 6,375,254 B1
(45) Date of Patent: Apr. 23, 2002

(54) COVER OF A MOTOR VEHICLE ROOF WITH A PLASTIC FRAME AND AN EDGE GAP SEAL AND A PROCESS FOR PRODUCING ONE SUCH COVER

(75) Inventor: Werner Pätz, Hofstetten (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/655,772

(22) Filed: Sep. 5, 2000

(30) Foreign Application Priority Data

Sep. 3, 1999 (DE) .......................... 199 42 039

(51) Int. Cl.⁷ ................ B60J 7/00; B60J 1/00
(52) U.S. Cl. .................. 296/216.09; 296/215
(58) Field of Search .............. 296/215, 216.06–216.09, 296/221–223, 146.15, 218; 49/480.1, 498.1

(56) References Cited

U.S. PATENT DOCUMENTS 5,882,066 A  3/1999  Schönebeck ........... 296/216.09

FOREIGN PATENT DOCUMENTS

| DE | 38 08 224 A1 | 9/1988 |
|---|---|---|
| DE | 197 07 145 | 3/1998 |
| DE | 195 57 454 C1 | 12/1998 |

Primary Examiner—Dennis H. Pedder
(74) Attorney, Agent, or Firm—Nixon Peabody LLP; David S. Safran

(57) ABSTRACT

A cover for a motor vehicle roof has a cover plate, a plastic frame which is foamed or injected around the edge of the cover plate, and that forms an edge gap seal on the outside edge of the plastic frame. The plastic frame on the outside edge has a groove which is open to the bottom and which is bordered to the outside by a lip which forms the edge gap seal and in which there is a plastic insert of a material which is softer than the material of the plastic frame. Further, it is a process for producing one such cover in which the plastic frame is injected or foamed on the edge of the cover plate, optionally with inclusion of the edge area of the reinforcing frame, and in which in the course of injection or foaming the plastic frame or in a subsequent step the plastic insert is placed in the groove of the plastic frame.

20 Claims, 3 Drawing Sheets

COVER OF A MOTOR VEHICLE ROOF WITH A PLASTIC FRAME AND AN EDGE GAP SEAL AND A PROCESS FOR PRODUCING ONE SUCH COVER

BACKGROUND OF THE INVENTION

1. Field of the Invention

The invention relates to a cover of a motor vehicle roof with a cover plate, a plastic frame which is foamed or injected and which runs around the edge of the cover plate, and an edge gap seal on the outside edge of the plastic frame. Furthermore, the subject matter of the invention is a process for producing one such cover.

2. Description of Related Art

A cover of the initially mentioned type for an openable vehicle roof is known for example from DE 197 07 145 C1. Here on the bottom of the cover plate there is a reinforcing frame which is securely joined to the cover plate by the plastic frame. The known cover has a peripheral edge gap seal which is inserted into the seal receiving groove of the plastic frame after producing the combination of the cover frame, reinforcing frame, and plastic frame by an injection or foaming process. This seal receiving groove is either milled or produced by a slide in a foaming tool, with which the plastic frame is foamed onto the cover plate and the reinforcing frame. This is a complex and expensive process which is moreover critical with respect to precision and process safety. In particular it must be stressed that the milling of the seal receiving groove requires that the corresponding equipment be made available. Aside from the fact that milling is an additional cycle, high wear of the cutting tool must be tolerated and a critical tolerance zone position must be considered. In addition, optical faults on the top of the plastic frame which typically consists of polyurethane cannot be avoided upon entry of the radius as a result of the milling equipment concept. Peripheral foaming by means of slides to form the seal receiving groove dictates a complex foaming tool, a relatively long cycle time by the slider function, a cleaning process and separation of the sliders, moreover deterioration of the foam flow as a result of the slider having to be expected. Finally, with respect to the separate edge gap seal, it must be stated that it is a relatively expensive individual part which requires tool costs, a high level of job planning and logistics as well as an additional installation process.

DE 196 24 715 C1 discloses another cover of the initially mentioned type of an openable vehicle roof which does not comprise a reinforcing frame. The plastic frame of this known cover has an initially free edge strip which extends to the outside and which can be bent with the formation of a hollow chamber and can be fixed with its outside edge near the peripheral edge of the cover plate adjacent to the plastic frame from underneath. To adapt to deviations in dimensions and unevenness in the edge gap between the roof recess and the cover, this hollow chamber is made adjustable. For this purpose, on the outside edge of the edge strip there is an inner surface section which after bending of the edge strip to form the hollow chamber on the opposite surface of the plastic frame can be adjustably fixed by means of a clamping profile strip. For this purpose, the clamping profile strip fits into a clamp groove of the frame body. The edge gap seal arrangement fixed by this hollow chamber as a result of its adjustment requirement is complex at least in installation. It is questionable whether the sealing function of this edge gap seal arrangement based on the hollow chamber which has been fixed in this way is ensured over the long term.

SUMMARY OF THE INVENTION

In view of this prior art, the object of this invention is to devise a cover of the originally mentioned type which can also be produced economically with respect to the edge gap seal and which ensures a permanently reliable sealing function. Furthermore, a process for producing one such cover will be made available.

Accordingly, the invention calls for integration of the edge gap seal into the outside edge of the plastic frame in the form of a lip which runs around the plastic outer frame and is fixed by a groove which has been formed in the outside edge of the plastic frame, a groove with a thin outside wall which forms this sealing lip. The cover is produced in the conventional manner by injecting or foaming of the plastic frame to the cover plate, however the groove which is open to the bottom and the lip which forms the edge gap seal being formed in doing so.

While basically the lip on the plastic frame inherently already makes available a sealing function relative to the pertinent contact surface of the vehicle roof, according to one especially advantageous development of the invention it is provided that in the groove there is a plastic insert of a material which is softer than the material of the plastic frame and thus always presses the lip against the pertinent contact surface of the vehicle roof. One additional advantage of the plastic insert is that other functions for the vehicle can be integrated into it, for example pinch protection, heating for the cover edge, an antenna, for example, a broadcast antenna or a GPS antenna, and the like.

The lip can be made with a raised outside contour to enhance the sealing function.

The base of the groove can pass into the lip via a weakening point which forms a hinge. In this way, during production the result is that a swivel point for forced mold removal in the formation of the groove by the foaming or injection process is made available. Upon later use in the vehicle roof the swivelling capacity of the lip is ensured by this weakening point also in the case in which the roof cutout which accommodates the cover is smaller than a stipulated nominal size.

The material for the plastic insert which is located in the groove can advantageously be foam, for example, a closed-pore foam such as microcellular rubber, for example.

To ensure the permanent seat of the plastic insert in the groove, the latter is advantageously adapted to the contour of the plastic insert. One especially advantageous embodiment calls for a groove which is roughly circular in cross section and a correspondingly shaped plastic insert. Here the outer lip is likewise convexly arched to the outside at least in one partial area.

The plastic insert can at least roughly completely fill the groove. But it can also have a cross section which only partially fills the cross section of the groove, can be made especially annular or inversely U-shaped in cross section and then can consist especially of an unfoamed plastic, for example rubber.

The cover can be made as a movable, especially raisable and/or slidable cover of an openable vehicle roof or as a roof element which is for example transparent or covered with solar cells and which is inserted immovably into the vehicle roof.

In the case of a movable cover, according to another advantageous development of the invention it is provided that the lip runs out to the bottom in a tapered drip end which can be easily made in the foaming or injection process. The cover plate of the movable cover can feasiblely be supported on a reinforcing frame. The latter can be cemented to the cover plate or also joined simply by the plastic frame surrounding the edge area of the reinforcing frame.

In the case of an immovably inserted cover it can be cemented or screwed to the vehicle roof, and in another embodiment of the invention the plastic frame can be made at the same time as a spacer which provides for a predetermined alignment of the top of the cover to the part of the vehicle roof which fits around the cover.

The plastic insert can be placed in the groove of the plastic frame in the course of injection or foaming of the plastic frame or in a subsequent step into the groove of the plastic frame.

According to one preferred approach, a prefabricated plastic insert can be fixed on a holding device in an injection or foaming tool which is used to form the plastic frame, then the plastic frame can be formed and when the injection or foaming tool for the plastic frame is opened the plastic insert can be released from the holding device.

In one modified process, after injecting or foaming the plastic frame to form the plastic insert a certain foam is placed in the groove of the plastic frame and foamed there.

These and further objects, features and advantages of the present invention will become apparent from the following description when taken in connection with the accompanying drawings which, for purposes of illustration only, show several embodiments in accordance with the present invention.

DETAILED DESCRIPTION OF PREFERRED EMBODIMENTS

Figure 1:
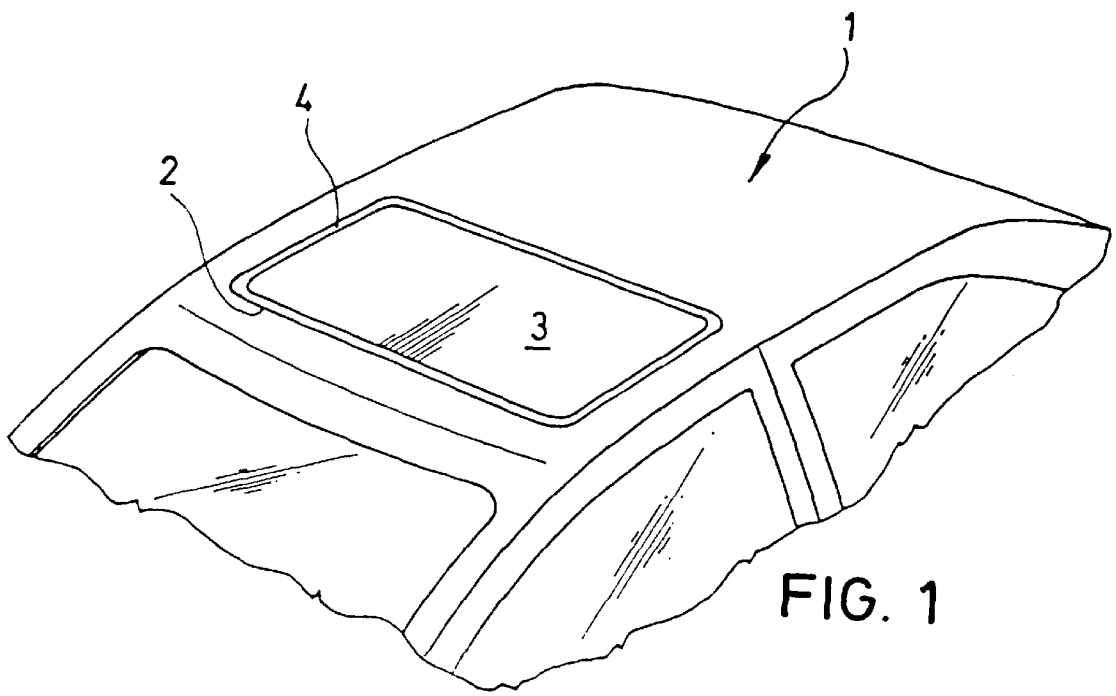
FIG. 1 is a perspective view of a vehicle roof.
Figure 2:
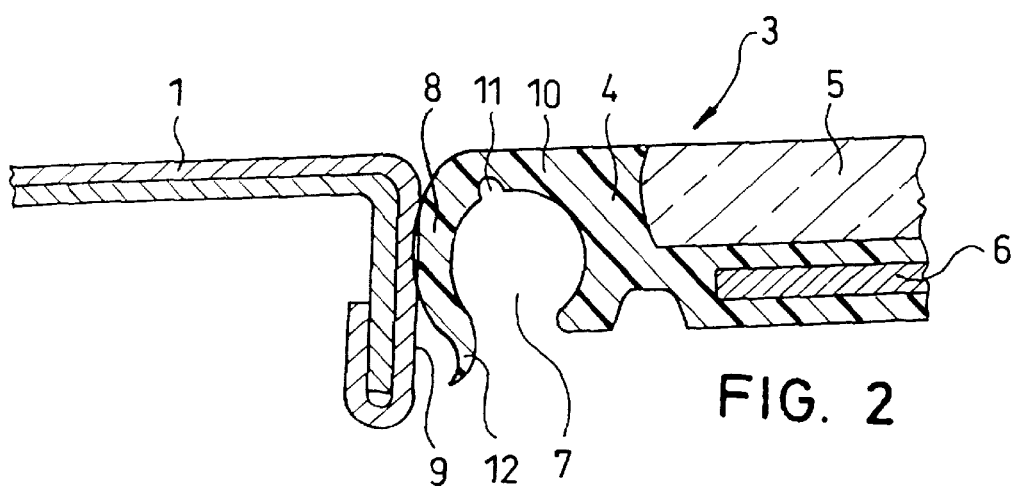
FIGS. 2 and 3 are cross sectional views of the edge area of a movable cover of the vehicle roof of FIG. 1 with different embodiments of the sealing lip integrated into the cover.
Figure 3:
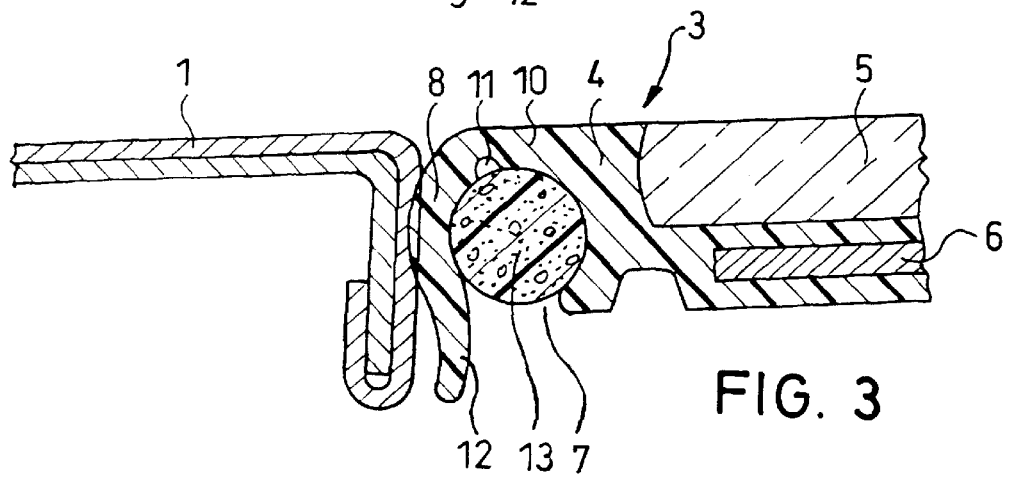
Figure 4:
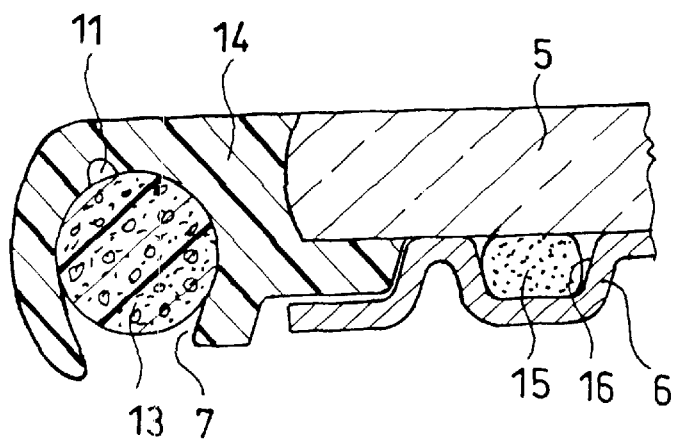
FIG. 4 is a cross sectional view of the edge area of a movable cover which has been cemented to a reinforcing frame.

A solid motor vehicle roof 1 has a roof opening 2 which, in the case of the embodiments of FIGS. 2, 3 and 4, can be selectively closed by a movable cover 3 or can be partially cleared at least by raising the rear edge of the cover 3. The cover 3 includes a peripheral plastic frame 4 which ensures the sealing function of the cover relative to the solid motor vehicle roof 1, as is explained below using FIG. 2.

The cover 3 includes a cover plate 5 preferably of transparent material, for example, glass or transparent plastic, and a reinforcing frame 6 and the above addressed plastic frame 4. The reinforcing frame 6 is, for example, as a punched sheet metal part. The plastic frame 4 is foamed around the edge of the cover plate 5, for example, by means of a corresponding tool and it also encompasses the edge area of the reinforcing frame 6 which is joined in this way to the cover plate 5.

In the outside edge of the plastic frame 4 a groove 7 which is open to the bottom with a generally cylindrical inside wall is formed. The groove 7 is bounded outside by a thin wall in the form of a lip 8 which has a raised, convex outside contour and is designed to engage the roof opening edge 9 as the sealing element with elastic contact against it. This elasticity is acquired by the lip 8 from a material of the corresponding stiffness, from its thin formation and from a likewise thin transition area 10 to the solid part of the reinforcing frame 6. Preferably, in the transition part 10 a weakening point 11, for example, a groove, is formed. This swivelling capacity of the lip 8 around a predetermined bending site becomes especially useful when the roof cutout is smaller than a stipulated nominal size so that the lip adjoins the roof opening edge 9 with a slight pretensioning to compensate for production tolerances and for sealing purposes.

The bottom end of the lip 8 runs out into a tapered drip end 12, which can be, for example, an elongated tongue (FIG. 3) or a shorter tongue (FIG. 2) which is curved in an S-shape.

In the embodiment shown in FIG. 3, in the groove 7 there is a plastic insert 13 which is made of a material which is softer than that of the plastic frame 4. The purpose of this plastic insert is to promote or support the elastic contact of the lip 8 with the roof opening edge 9. The plastic insert 13 can be, for example, a closed-pore foam such as a microcellular rubber cord. This plastic insert 13 is also suitable for holding other elements, such as, for example, an antenna, pinch protection, or a heating system in the form of an electrical heating wire for the cover edge. Among others, a plastic tube, especially a rubber tube, is also suitable as the plastic insert.

Making the annular gap seal on the cover in the form of a lip which forms an integral part of the reinforcing frame has the advantage that the outside dimensions of the cover can be fixed more accurately. Even when using a plastic insert in the groove which fixes the lip can one such edge gap seal be produced more economically than the conventional edge gap seals which were explained initially and which require a receiving groove for a separate sealing element. In addition, the installation is simpler.

In the embodiment shown in FIG. 4, a plastic frame 14 is injected onto the cover plate 5 as the edge profile without fitting around the outside edge of the reinforcing frame 6 at the same time. The plastic frame 14 is made of a thermoplastic elastomer, for example Sentopren® from Monsanto Company, St. Louis, Mo., USA. The cover plate 5 is cemented to the reinforcing frame 6 via a cement trace 15. The cement trace 15 is placed in a channel 16 of the reinforcing frame 6 and adjoins the bottom edge of the cover plate 5.

Figure 5:
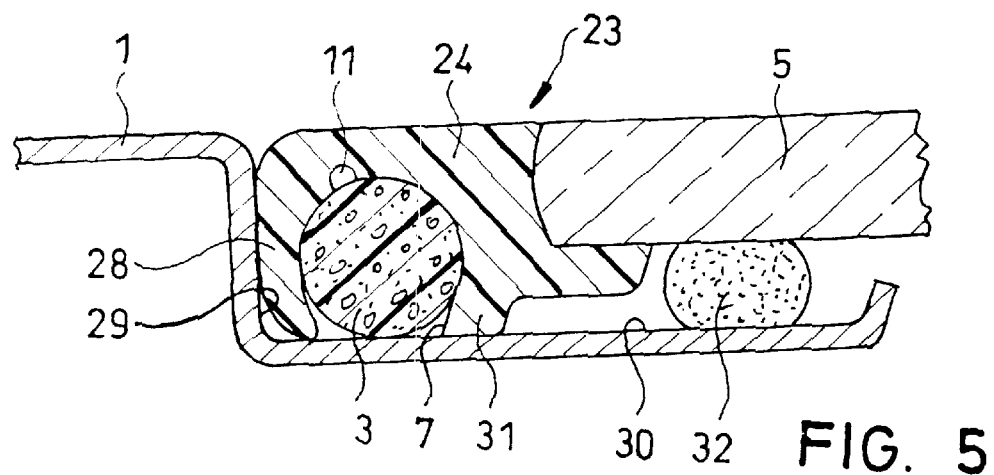
FIGS. 5 and 6 are cross sectional views of the edge area of an immovable cover of the vehicle roof of FIG. 1 with a different execution of the connection between the cover and the vehicle roof.
Figure 6:
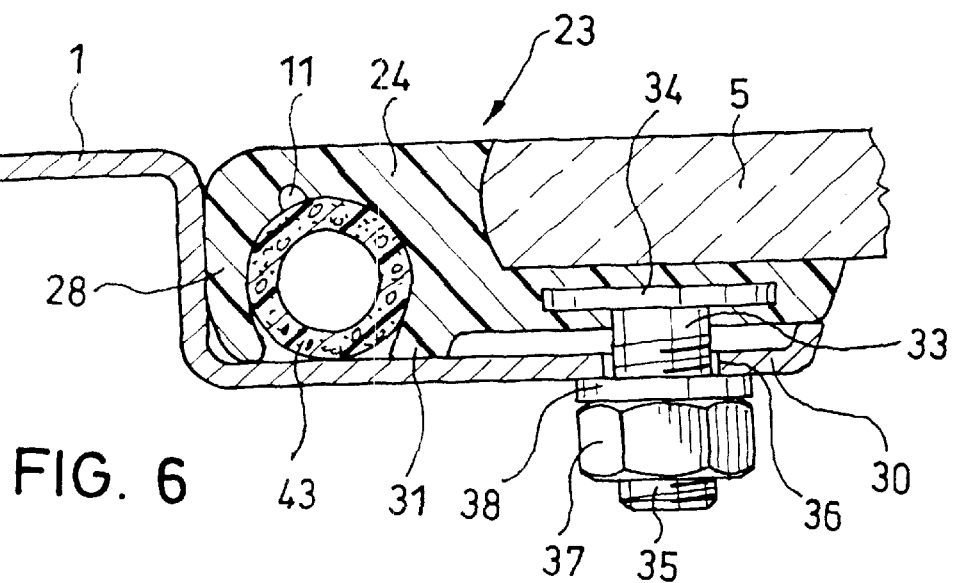

FIGS. 5 and 6 show embodiments of a cover 23 which is inserted securely into the motor vehicle roof 1, and the cover plate 5 which is made of glass, transparent plastic or another plate material can be, for example, transparent or can be covered with solar cells.

In the embodiment as shown in FIG. 5, the outside edge of the cover plate 5 of the cover 23 is peripherally foamed with polyurethane or the like with the formation of a plastic frame 24 which in turn forms the groove 7 with the weakening point 11. The weakening point 11 to the outside adjoins a lip 28 which adjoins a roof opening edge 29 and forms a seal and in this way seals the roof against water and dirt. In the groove 7 is the above explained plastic insert 13. The lip 28 need not be provided with a drip end (according to the drip end 12 of the lip 8 in FIGS. 2 and 3). The motor vehicle roof 1 is offset to the bottom in the area of the roof opening edge 29 with the formation of a support flange 30. A spacer 31 which sits on the flange 30 is molded to the plastic frame 24. The spacer provides for a predetermined alignment, for example, mutual alignment, of the top of the cover 23 and the part of the motor vehicle roof 1 which fits around the cover 23. To join the cover 23 and the roof 1 there is a cement bead 32 which adjoins the bottom of the cover plate 5 and the top of the flange 30 and in the embodiment shown borders the plastic frame 24 to the inside.

The embodiment as shown in FIG. 6 differs from the one shown in FIG. 5 in that the cover 23 is not cemented to the motor vehicle roof 1, but is screwed to it. For this purpose, studs 33 are inserted into the plastic frame 24. A head 34 of the stud 33 is surrounded by the material of the plastic frame 24 and includes a threaded shaft 35 which is inserted through an opening 36 of the support flange 30. Onto the free bottom end of the threaded shaft 35 a nut 37 is screwed which presses against a washer 38. In addition, FIG. 6 shows one embodiment in which a plastic tube, especially a rubber tube, is provided as the plastic insert 43.

Figure 7:
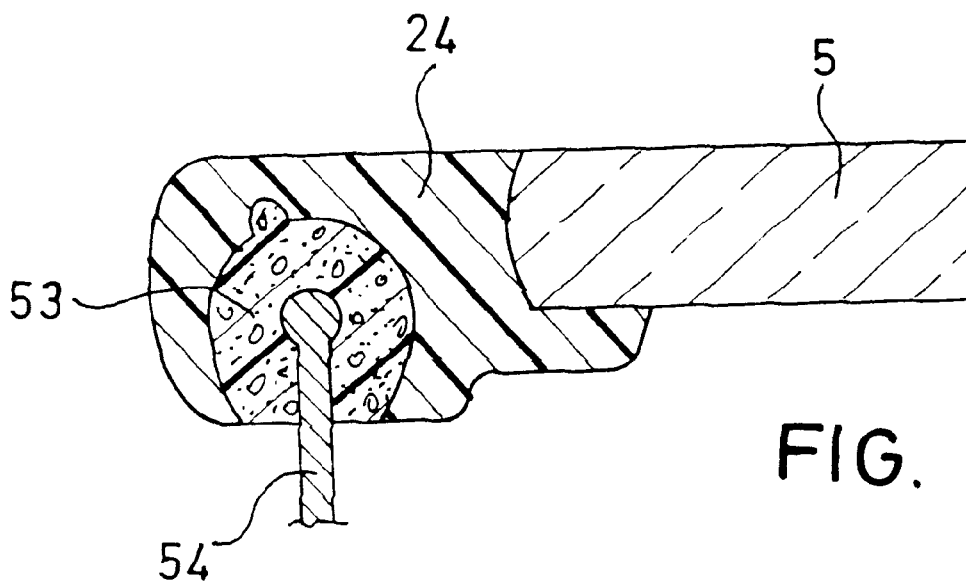
FIGS. 7 and 8 are enlarged cross sectional views of the cover edge area.

FIG. 7 shows one embodiment with a plastic insert 53 which is inversely U-shaped in cross section, and is made of foam, preferably microcellular rubber, which can be injected or foamed in when the plastic frame 24 is foamed or injected onto the cover plate 5. To do this the prefabricated plastic insert 53 is slipped onto a journal 54 which is mounted in the foaming or injection tool which is not described and which is used to produce the plastic frame 24. During the foaming or injection process the plastic insert 53 is held by the journal 54 and is injected or foamed into the plastic frame 24 at the same time. When the foaming or injection tool is opened the journal 54 comes out of the plastic insert 53.

Figure 8:
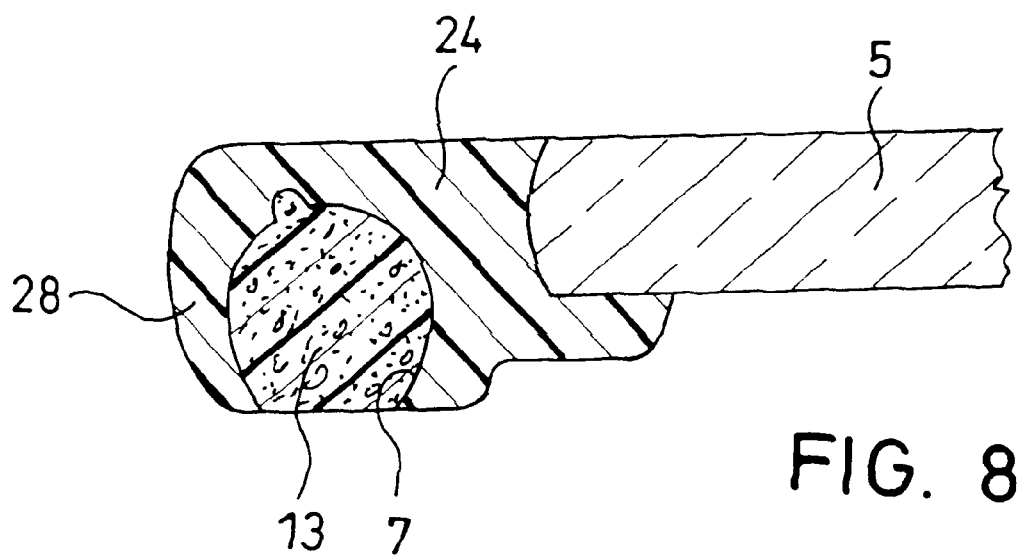

In the production of the cover as shown in FIG. 8, in a first step the plastic frame 24 which is to be produced for example from polyurethane is foamed or injected onto the cover plate 5 with the formation of the groove 7 and the lip 28. In a second step, foam, preferably microcellular rubber material, is placed in the groove 7 of the plastic frame 24 and is completely reacted. This insertion can be done in a second step in the forming or injection tool which is used for producing the plastic frame 24 and also staggered in time outside the tool in another device.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. A cover for a motor vehicle roof, said cover comprising:
   a cover plate;
   a frame around the edge of said cover plate; and
   a prefabricated insert made of a material which is softer than the frame material
   wherein said frame has a lip on the outside edge of said frame that defines a groove that is open to the bottom side of said frame, wherein said lip is adapted to form an edge gap seal with said motor vehicle roof, and wherein said insert is positioned in said groove and is held therein by the inside surface of said groove having a shape which is complementary to a major portion of an outside surface of said insert.

2. The cover of claim 1, wherein said frame is a plastic frame.

3. The cover of claim 1, wherein said lip has a raised, convex outside contour.

4. A cover for an openable motor vehicle roof, said cover comprising:
   a cover plate for movably mounting in a vehicle roof;
   a frame around the edge of said cover plate; and
   a prefabricated insert made of a material which is softer than the frame material;
   wherein said frame has a lip on the outside edge of said frame that defines a groove that is open to the bottom side of said frame, wherein said lip is adapted to form a disengageable edge gap seal with said openable motor vehicle roof; and wherein said insert is positioned in said groove and is held therein by an inside surface of said groove having a shape which is complementary to a major portion of an outside surface of said insert.

5. An immovable cover for a motor vehicle roof, said cover comprising:
   a cover plate;
   a frame around the edge of said cover plate;
   means immovably fixing the cover plate relative to said roof; and
   a prefabricated insert made of a material which is softer than the frame material;
   wherein said frame has a lip on the outside edge of said frame that defines a groove that is open to the bottom side of said frame, wherein said lip is adapted to form an edge gap seal with said motor vehicle roof; and wherein said insert is positioned in said groove and is held therein by an inside surface of said groove having a shape which is complementary to a major portion of an outside surface of said insert.

6. The cover of claim 1, wherein said inside surface of said groove is circular in cross-section at least in a partial area thereof.

7. The cover of claim 1, wherein said insert substantially fills the cross-section of said groove.

8. The cover of claim 1, wherein said insert only partially fills the cross-section of said groove.

9. The cover of claim 1, wherein said insert is annular in cross-section.

10. The cover of claim 1, wherein said insert is U-shaped in cross-section.

11. The cover of claim 1, wherein said insert is a foam insert.

12. The cover of claim 11, wherein said foam insert is a microcellular rubber insert.

13. The cover of claim 1, further comprising a hinge that connects said lip to said frame.

14. The cover of claim 1, wherein said lip includes a tapered drip end.

15. The cover of claim 1, further comprising a reinforcing frame supporting said cover plate.

16. The cover of claim 15, wherein said frame surrounds an edge of said reinforcing frame.

17. The cover of claim 15, wherein said reinforcing frame is cemented to said cover plate.

18. The cover of claim 5, wherein said frame includes a spacer that provides a predetermined alignment of said cover to said vehicle roof.

19. The cover of claim 5, wherein said means immovably fixing the cover plate relative to said roof comprises said cover being cemented to said roof.

20. The cover of claim 5, wherein said means immovably fixing the cover plate relative to said roof comprises a threaded fastener that fastens said cover to said roof.

\* \* \* \* \*